(12) United States Patent
Zaiki

(10) Patent No.: US 9,045,060 B2
(45) Date of Patent: Jun. 2, 2015

(54) VEHICULAR SLIDE RAIL DEVICE

(71) Applicant: SHIROKI CORPORATION, Kanagawa (JP)

(72) Inventor: Noriyuki Zaiki, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/386,182

(22) PCT Filed: Sep. 27, 2013

(86) PCT No.: PCT/JP2013/076191
§ 371 (c)(1),
(2) Date: Sep. 18, 2014

(87) PCT Pub. No.: WO2014/054513
PCT Pub. Date: Apr. 10, 2014

(65) Prior Publication Data
US 2015/0048603 A1 Feb. 19, 2015

(30) Foreign Application Priority Data
Oct. 5, 2012 (JP) .................................. 2012-223042

(51) Int. Cl.
*B60R 21/207* (2006.01)
*B60N 2/08* (2006.01)
*B60N 2/07* (2006.01)

(52) U.S. Cl.
CPC ............ *B60N 2/0881* (2013.01); *B60N 2/0705* (2013.01); *B60N 2/0818* (2013.01); *B60N 2/0722* (2013.01); *B60R 21/207* (2013.01)

(58) Field of Classification Search
CPC .. B60N 2/0881; B60N 2/0837; B60N 2/0831; B60N 2/085; B60N 2/0722; B60N 2/0705; B60N 2/0818; B60R 21/207
See application file for complete search history.

(56) References Cited

U.S. PATENT DOCUMENTS

| 2008/0001446 A1* | 1/2008 | Suzuki et al. ............... 297/216.1 |
| 2012/0007407 A1 | 1/2012 | Komamura et al. |
| 2014/0110553 A1* | 4/2014 | Hoshihara et al. ............ 248/429 |
| 2014/0239140 A1* | 8/2014 | Yamada et al. ............... 248/429 |
| 2015/0001366 A1* | 1/2015 | Nakashima et al. .......... 248/429 |

FOREIGN PATENT DOCUMENTS

| JP | 2002-154355 A | 5/2002 |
| JP | 2012016970 A | 1/2012 |

OTHER PUBLICATIONS

International Search Report for PCT/JP2013/076191 dated Oct. 22, 2013.
English Abstract of JP-2002154355, Publication Date: May 28, 2002.
English Abstract of JP-2012016970, Publication Date: Jan. 26, 2012.

* cited by examiner

*Primary Examiner* — Drew Brown
(74) *Attorney, Agent, or Firm* — Millen, White, Zelano & Branigan, PC

(57) ABSTRACT

A vehicle slide rail device is provided, which can reduce the possibility of the lock mechanism provided between the upper rail and the lower rail unintentionally lock-releasing when the cushion airbag is inflated.

As a solution, the lock-release lever 40 is provided with a lock-release contacting portion 46, which is positioned away from a press portion 65 of the lock operational lever when the lock operational lever is positioned at a lock-allowing position and which receives a force from the press portion for rotating the lock release lever toward the unlocking position when the lock operational lever rotates from the lock-allowing position toward the lock-release position. When the upper rail 30 is deformed downwardly due to pressure by the inflating of a cushion airbag 80, the lock release lever moves downwardly together with a downwardly deforming portion of the upper rail and the lock-release contacting portion moves in a direction to closely approach the press portion of the lock operational lever.

2 Claims, 8 Drawing Sheets

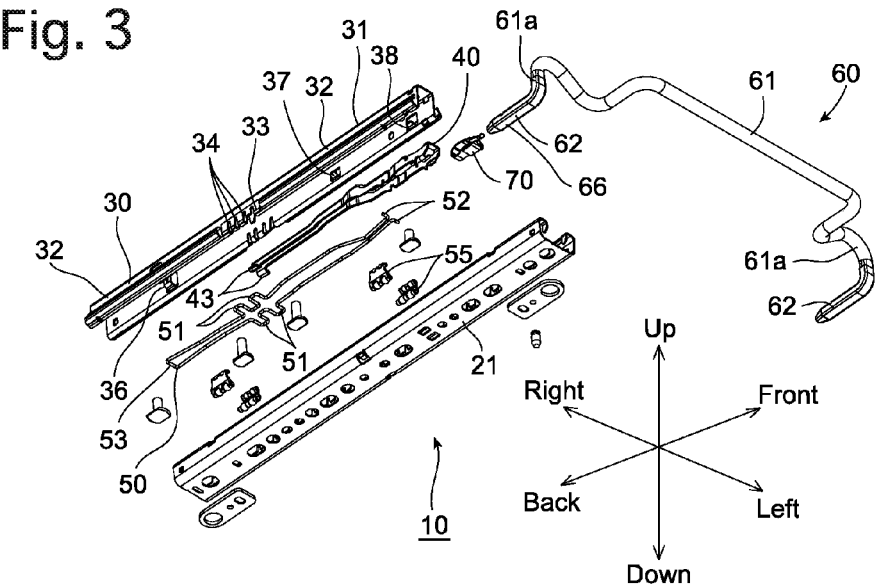
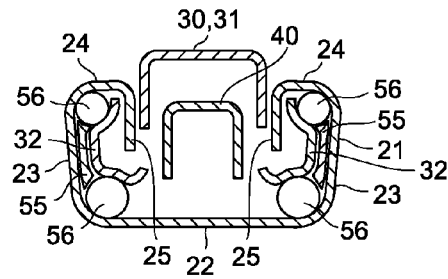
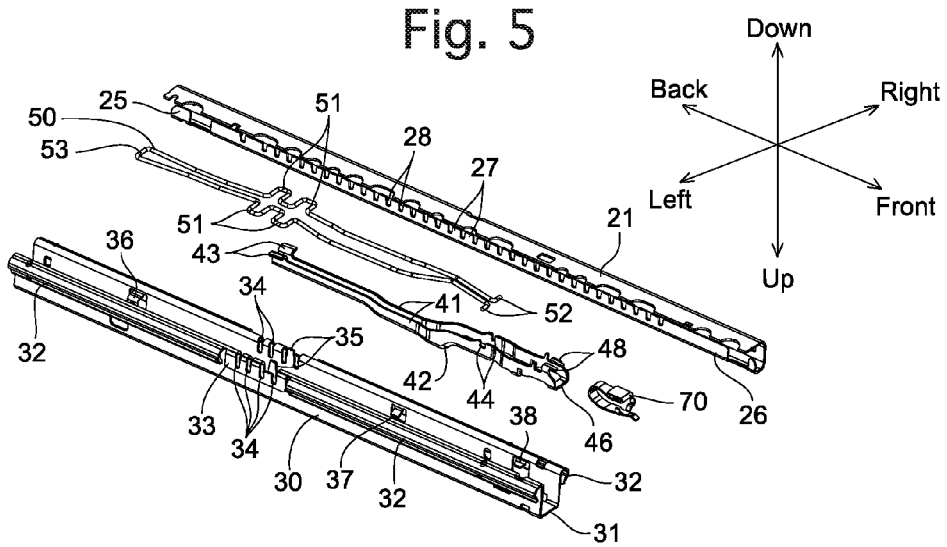

VEHICULAR SLIDE RAIL DEVICE

TECHNICAL FIELD

The present invention relates to a vehicle slide rail device which supports a seat in a slideable manner.

BACKGROUND ART

The vehicle slide rail device of Patent Literature 1 is provided with a pair of left and right lower rails which are fixed to a vehicle interior floor, extend in the forward/rearward direction and include a large number of lock grooves arranged in a forward/rearward direction; a pair of left and right upper rails which support a seating portion of a seat and are slideably supported by the left and right lower rails; a pair of left and right lock-release levers which are rotatably supported on the left and right upper rails about an axis extending in the leftward/right direction, are disengageably engageable with the lock grooves, and are provided inside the inner space of the upper rails, respectively, except for front end portions thereof; a biaser which rotatably biases the lock-release levers in a direction to engage with the lock grooves; and a lock operational lever (loop handle), having an approximately U-shape in a plan view, the left and right rear end portions thereof being connected to the front end portions of the left and right lock levers.

When an occupant applies no operating force to the lock operational lever, the sliding of the upper rails relative to the lower rails is restricted since the lock-release lever is engaged with some of the lock grooves by the biasing force of the biaser. On the other hand, upon an occupant pulling up the lock operational lever, since each lock-release lever is released from the engagement with the lock grooves against the biasing force of the biaser, the upper rails can slide relative to the lower rails.

CITATION LIST

Patent Literature

PATENT LITERATURE 1: Japanese Unexamined Patent Publication 2002-154355
PATENT LITERATURE 2: Japanese Unexamined Patent Publication 2012-16970

SUMMARY OF THE INVENTION

Technical Problem

There is a type of vehicle seat known in the art in which a built-in cushion airbag is provided inside a seat cushion (Patent Literature 2). If a vehicle having such a type of vehicle seat mounted therein collides with another obstacle (vehicle, etc.) that is positioned in front of the vehicle, a signal is sent from an ECU (Electronic Control Unit) which is provided in the vehicle to an inflater that is connected to the cushion airbag, and the inflater injects gas. Accordingly, since the cushion airbag is instantly inflated by the gas pressure, and hence, the seat cushion expands, the forward motion of the passenger can be restricted.

However, when this cushion airbag is applied to the vehicle slide rail device of Patent Literature 1, there is a possibility of the following problem occurring. Namely, when the cushion airbag inflates upon a collision occurring so that the seat cushion expands, there is a possibility of part of the upper rail deforming downwardly due to the expansion pressure of the seat cushion so that the lock-release lever which is pressed by a deformed portion of the upper rail (part of the roof underside portion) may unintentionally rotate to the unlocked position (in a direction of releasing the engagement with the lock grooves).

In particular, in a type of slide rail device in which a lock-release lever is provided inside an internal space of each upper rail, such as in that of Patent Literature 1, the above-described problem easily occurs due to the distance between the deformed portion (roof underside portion) of the upper rail and the lock-release lever being close.

The present invention provides a vehicle slide rail device which can reduce the possibility of the lock mechanism provided between the upper rail and the lower rail unintentionally lock-releasing when the cushion airbag is inflated.

Solution to Problem

A vehicle slide rail device according to the present invention is characterized by including a lower rail which extends in a forward/rearward direction and is immovable relative to a floor of the vehicle; an upper rail which supports a seat and is supported by the lower rail to be slideable in the forward/rearward direction; a lock mechanism which restricts or releases restriction of a sliding movement of the upper rail; a lock release lever which is interconnected with the lock mechanism, and which is upwardly and downwardly rotatable relative to the upper rail between a locked position, at which the restriction of sliding via the lock mechanism is allowed, and an unlocked position, at which the restriction of sliding is released; a lock operational lever, a rear portion of which is upwardly/downwardly rotatably connected to a front portion of the lock release lever, the lock operational lever being rotatable between a lock-allowing position, in which the lock release lever is positioned at the locked position, and a lock-release position, in which the lock release lever is moved to the unlocked position; a biaser, provided between the lock release lever and the lock operational lever, the biaser rotatably biasing the lock operational lever toward the lock-allowing position with respect to the lock release lever; and a cushion airbag, attached to the seat, the cushion airbag inflating when a front portion of the vehicle collides with another object, other than the vehicle. The lock operational lever rotates to the lock-release position by a front portion of the lock operational lever moving upward, relative to the rear portion thereof, when positioned at the lock-allowing position. The lock-release lever is provided with a lock-release contacting portion, which is positioned away from a press portion of the lock operational lever when the lock operational lever is positioned at the lock-allowing position and which receives a force from the press portion for rotating the lock release lever toward the unlocking position when the lock operational lever rotates from the lock-allowing position toward the lock-release position. When the upper rail is deformed downwardly due to pressure by the inflating of the cushion airbag, the lock release lever moves downwardly together with a downwardly deforming portion of the upper rail and the lock-release contacting portion moves in a direction to closely approach the press portion of the lock operational lever.

The upper rail can be formed in a channel shape, and the lock mechanism and the lock release lever can be provided in an internal space within the upper rail.

Advantageous Effects of the Invention

According to the present invention, if the upper rail deforms by the pressure caused by the expansion of the cushion airbag, the lock-release lever moves downwardly together with the lower deforming portion of the upper rail, and the lock-release contacting portion of the lock-release lever moves toward the pressing portion of the lock operational lever.

However, when the lock operational lever is positioned at the lock-allowing position, since the lock-release contacting portion of the lock-release lever and the pressing portion of the lock operational lever are separated from each other (since there is play in the interconnecting portion of the lock-release lever and the lock operational lever), the lock-release lever freely moves downward by the above-mentioned clearance gap without interfering with the pressing portion of the lock operational lever, which remains at the initial position thereof due to the influence of inertia (the upward rotational amount of the lock-release lever, which occurs due to the lock-release lever interfering with the pressing portion of the lock operational lever, is reduced by the above-mentioned clearance gap).

Accordingly, even if the cushion airbag inflates, the possibility of the locked state, via the lock mechanism, being unintentionally released can be reduced.

According to the invention of claim 2, in the case where a lock mechanism and a lock-release lever are provided in an internal space within an upper rail, since the distance between the deforming portion of the upper rail and the lock-release lever is close, generally there is an increased possibility of the lock mechanism being unintentionally released due to inflation of the cushion airbag.

Accordingly, the effect obtained by applying the present invention can be further increased.

BRIEF DESCRIPTION OF DRAWINGS

FIG. 3 is a front exploded perspective view showing the right-side slide rail device with the left rail unit omitted, viewed obliquely from below;

FIG. 4 is a cross sectional view taken along the line IV-IV shown in FIG. 1;

FIG. 5 is an exploded perspective view of a rail unit showing the lower rail in a longitudinal sectional view;

DESCRIPTION OF EMBODIMENTS

Figure 1:
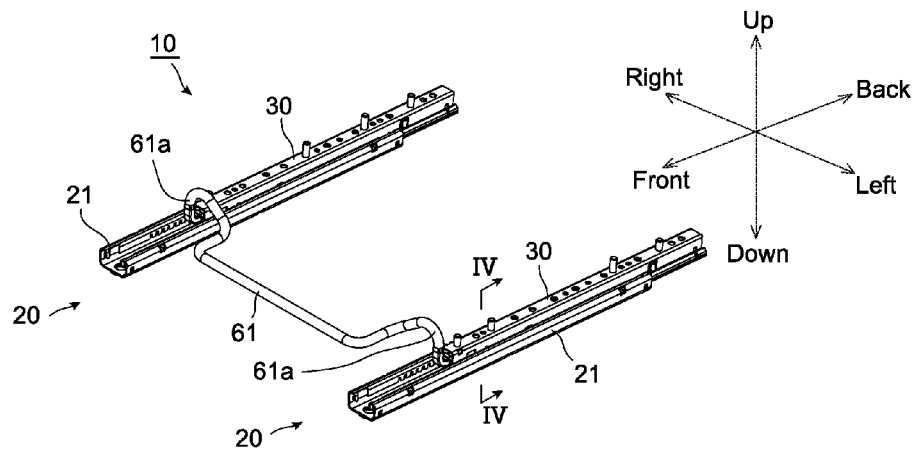
FIG. 1 is a front perspective view showing a first embodiment of a right-sided slide seat device (of a driver seat), according to the present invention, viewed obliquely from above, in which the upper rails have been slided to the rear ends.
Figure 2:
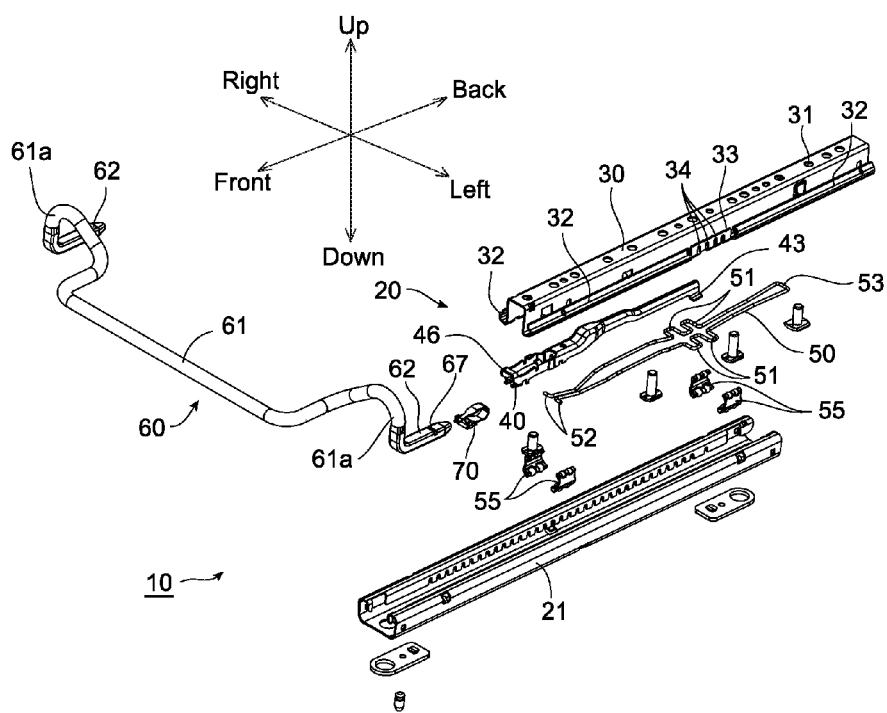
FIG. 2 is a front exploded perspective view showing the right-sided slide rail device with the right rail unit omitted, viewed obliquely from above.

A first embodiment of the present invention will be hereinafter discussed with reference to the attached drawings. Note that directions described in the following description are defined based on the directions of arrows shown in the drawings.

A slide rail device 10 is installed onto a vehicle interior floor of an automobile (vehicle), not shown in the drawings. A seat (provided with a seatback and a seat cushion SC shown in FIG. 15) is fixed to upper surfaces of the slide rail device 10 (upper rails 30).

The detailed structure of the slide rail device 10 will be discussed hereinafter.

The slide rail device 10 supports a right seat (or driver seat) and is provided, as large components thereof, with a pair of left and right rail units 20, and a loop handle 60 which connects the front ends of the left and right rail units 20. The left and right rail units 20 are bilaterally-symmetrical while the loop handle 60 has a bilaterally-symmetrical shape, and hence, the slide rail device 10 is bilaterally symmetrical as a whole.

The left and right rail units 20 have the following structure.

Each rail unit 20 is provided with a lower rail 21 which is mounted onto the vehicle interior floor via a pair of front and rear mounting brackets 15. Each lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, left and right pair of roof underside portions 24 which extend inward from the top edges of the left and right pair of outer wall portions 23, respectively, and a pair of left and right inner wall portions 25 which extend downwardly from the inner edges of the left and right roof underside portions 24. As shown in FIG. 5, etc., the upper edge portions of the left and right inner wall portions 25 (the portions connected to the roof underside portions 24) constitute base-end supporting portions 26 that extend in the forward/rearward direction. Lower edge portions of the left and right inner wall portions 25 are provided with a large number of lock teeth 27 (lock mechanism), the upper ends thereof connecting with the base-end supporting portions 26, arranged at equal intervals in the forward/rearward direction. Lock grooves 28 (lock mechanism), the bottom ends of which are open, are formed between mutually adjacent lock teeth 27.

Figure 6:
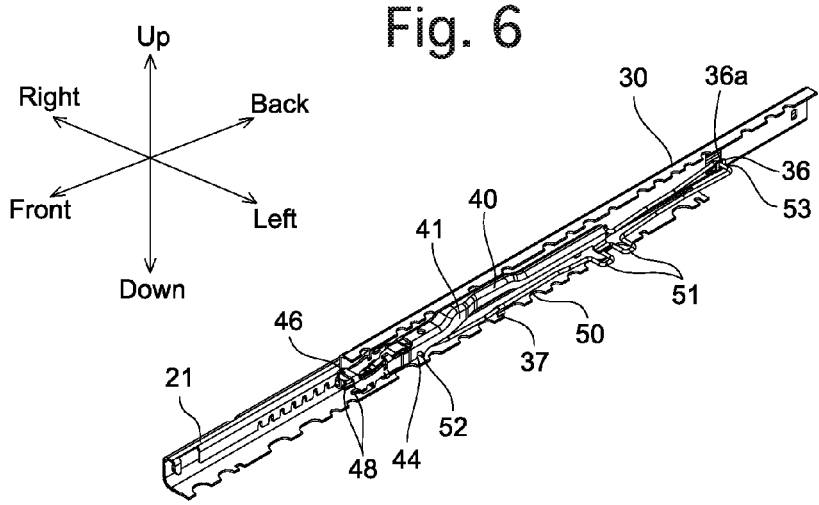
FIG. 6 is a front perspective view of the rail unit showing a cross sectional view of the lower rail, viewed obliquely from above.
Figure 7:
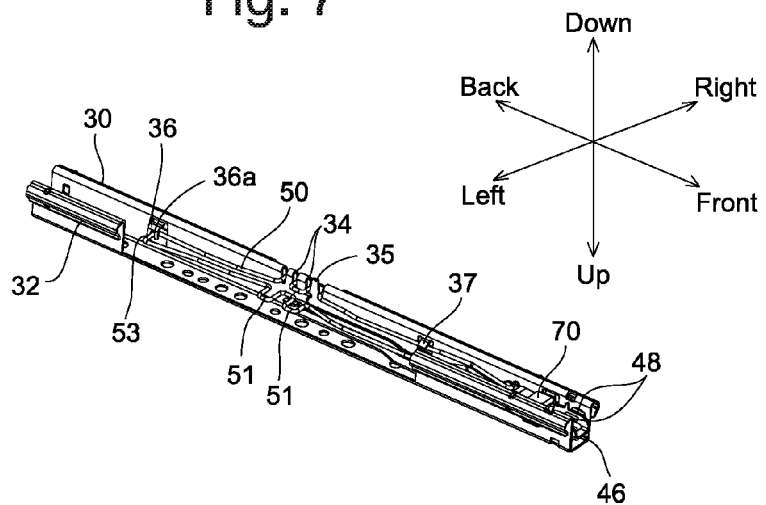
FIG. 7 is a front perspective view of the upper rail, with a section thereof cut-away, a lock-release lever, and a lock spring, viewed obliquely from below.

Each rail unit 20 is provided with an upper rail 30 that is slideable in the forward/rearward direction with respect to the associated lower rail 21. The upper rail 30 is a metal channel member which extends in the forward/rearward direction and the bottom thereof is open, and is provided with a base 31 having a substantially inverted U-shaped cross section, upright walls 32 which extend upward from lower end portions of the left and right side walls of the base 31, excluding central portions thereof in the longitudinal direction, and locking walls 33 which extend upward from the above-mentioned central portions of the side walls. As shown in FIGS. 2, 3, 5 and 9, etc., four forward/rearward movement restriction grooves 34 are formed over the lower edges of the left and right locking walls 33 and the lower edges of the side walls of the base 31 to extend upward. Furthermore, downward projecting restriction portions 35 are integrally provided on lower edges of the side wall portions of the base portion 31 in the vicinity of the front end thereof and extend further downward than the lower ends of the forward/rearward movement restriction grooves 34. In addition, as shown in FIGS. 3, 6 and 7, etc., the base 31 is provided, in the rear portion of the left and right side wall portions thereof, with lock-engaging lugs 36, which are formed by cutting and raising a portion of the base 31 to extend inward and, thereafter, upward. Downward-facing spring lock-engaging grooves 36a are formed in the upper ends of the left and right lock-engaging lugs 36. Furthermore, lock-engaging lugs 37 (supporting portions), which are formed by cutting and raising portions of the left and right side wall portions of the base portion 31, are positioned slightly in front of central portions of the left and right side wall portions, and extend inwardly. Furthermore, substantially horizontal lower support portions 38, which project inwardly from the lower edges of the left and right side walls, are integrally provided on the base 31 near the front end thereof.

Each rail unit 20 is further provided with a lock release lever 40, a lock spring 50, and a biasing spring (biaser) 70 that are installed in the associated upper rail 30.

The lock release lever 40 is a press-molded metal channel member, formed from a metal plate, which extends in the forward/rearward direction and the bottom thereof is open, and is provided with a pair of left and right side walls 41. As shown in FIGS. 2, 5, 10 and 11, etc., a rotational contact protrusion 42 which extends in the leftward/rightward direction protrudes from an upper surface of the lock release lever 40. In addition, a pair of left and right substantially horizontal spring pressing-pieces 43 are respectively provided on the rear end portion of the lock release lever 40, and upward-facing spring-hook grooves 44 are formed in the lower edges of the front portions (the portions positioned forward from the rotational contact protrusion 42) of the left and right side walls 41, respectively. As shown in FIG. 12, etc., a roof hole 45 is formed in the upper side of the lock release lever 40 in the vicinity of the front end thereof, and an upper supporting portion (lock-release contacting portion) 46 is provided at the upper portion of the front end of the lock release lever 40 to connect the front ends of the left and right side walls 41. Furthermore, a spring-hook recess 47 is formed at the upper edge portion in the vicinity of the front ends of the left and right side walls 41, and inwardly-facing substantially horizontal underside supporting pieces 48 are provided on the lower edges of the front ends of the left and right side walls 41.

The lock spring 50 is a bilaterally-symmetrical member formed by bending a metal wire material. A pair of front and rear locking portions 51 (lock mechanism) which extend substantially horizontally outwards are formed on portions of each of left and right side portions of the lock spring 50 at positions slightly behind the central portion of the lock spring 50 with respect to the longitudinal direction. The part of the lock spring 50 that is positioned behind the locking portions 51 of the lock spring 50 is substantially horizontal when in a free state, and the part of the lock spring 50 that is positioned in front of the locking portions 51 is substantially horizontal when in a free state. The lock spring 50 is provided at the front end thereof with a pair of left and right front-end locking lugs 52 which project outwardly in a substantially horizontal direction. Furthermore, the rear-end portion of the lock spring 50 constitutes a rear-end lock-engaging portion 53, which extends in the leftward/rightward direction in a plan view.

Figure 9:
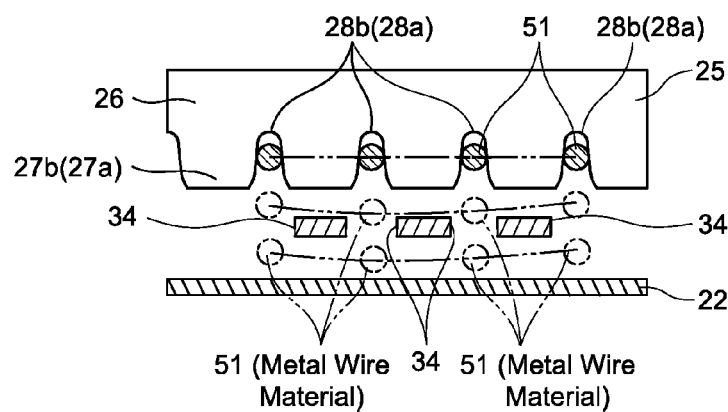
FIG. 9 is a schematic side elevational view showing states of the lock spring when the lock-release lever is positioned at the locked position and the unlocked position.
Figure 10:
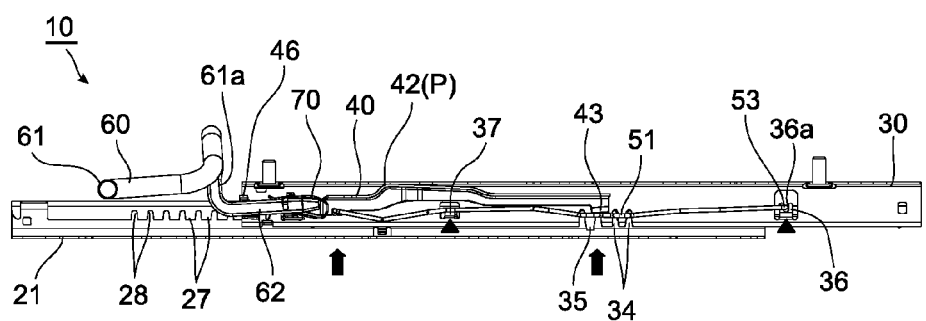
FIG. 10 is a side elevational view of the upper rail, the lock-release lever, a biasing spring and a loop handle, when in a locked state, in which only the upper rail is shown as a longitudinal section view.
Figure 11:
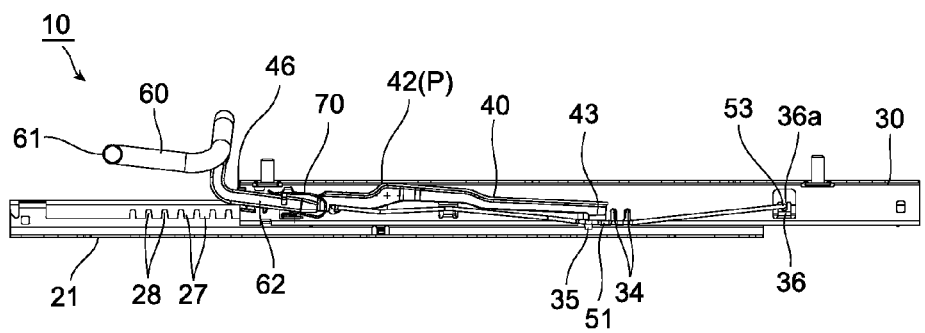
FIG. 11 is side elevational view similar to that of FIG. 10 when in an unlocked state, with the biasing spring omitted.
Figure 12:
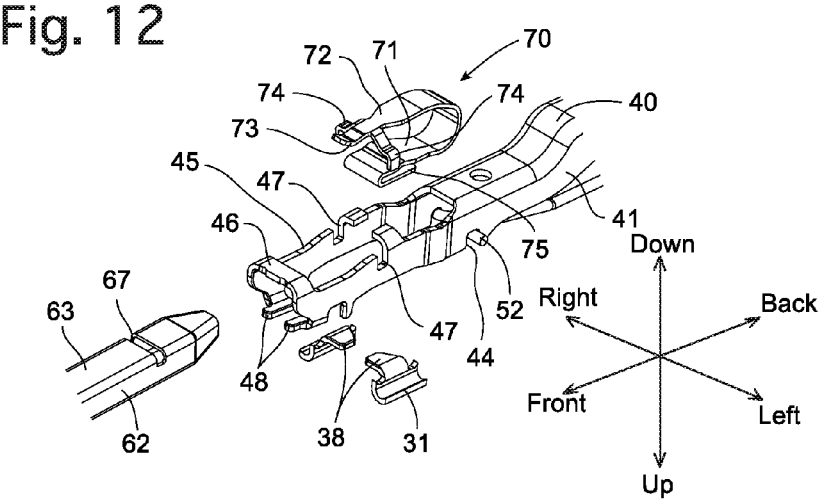
FIG. 12 is an enlarged exploded perspective view showing the front-end portion of the lock-release lever, the biasing spring, a lower supporting portion, and a rear-end portion of the loop handle.
Figure 13:
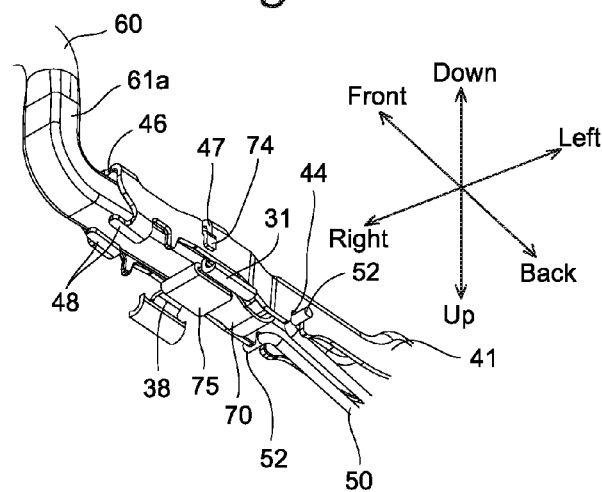
FIG. 13 is an enlarged perspective view of the front-end portion of the lock-release lever, the biasing spring, and the rear-end portion of the loop handle when mutually assembled with each other, viewed from below.
Figure 14:
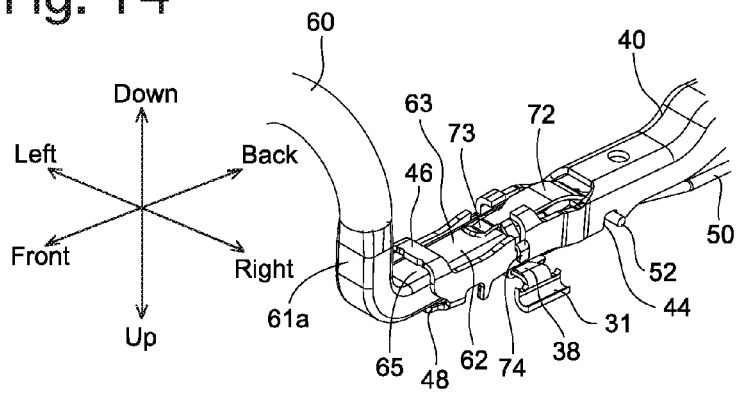
FIG. 14 is an enlarged perspective view of the front-end portion of the lock-release lever, the biasing spring, and the rear-end portion of the loop handle when mutually assembled with each other, viewed from above.
Figure 15:
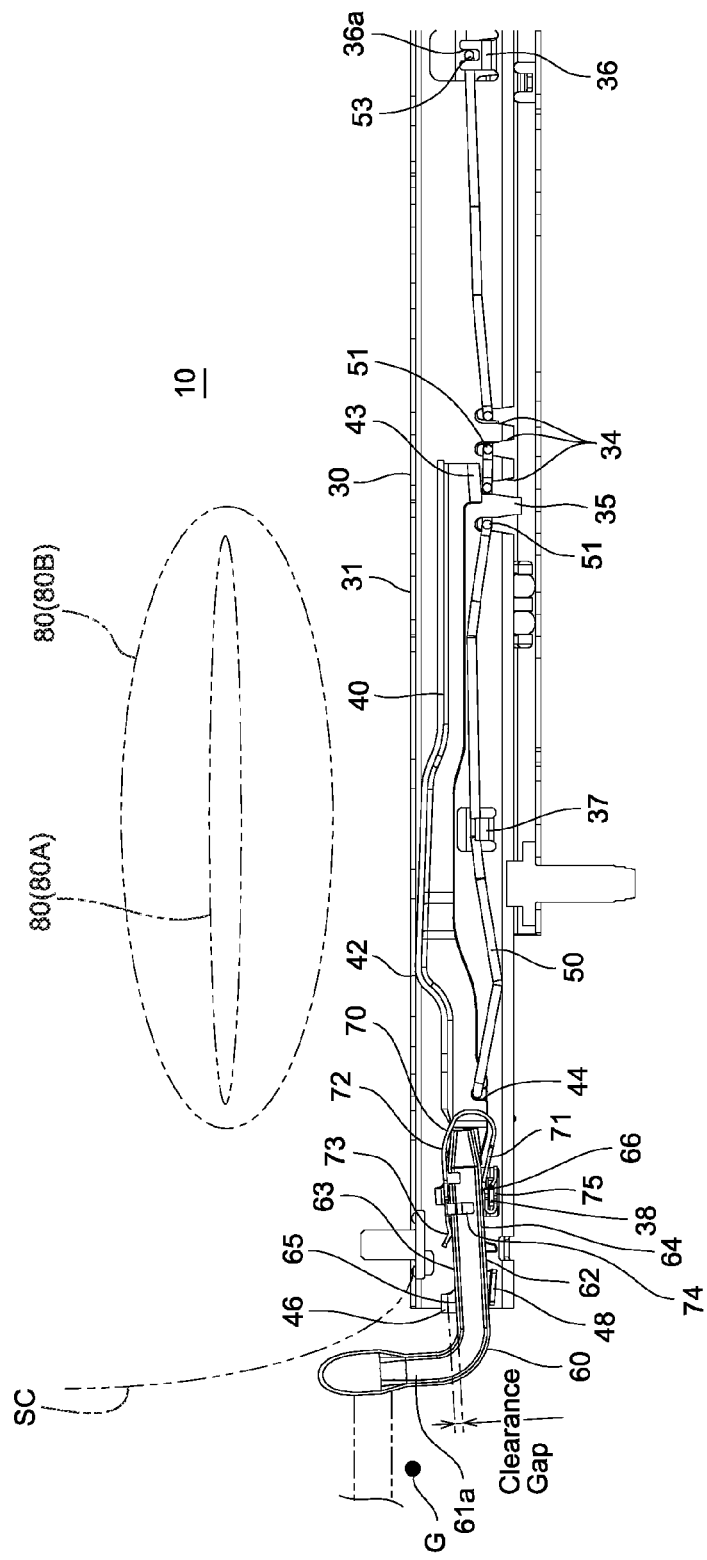
FIG. 15 is an enlarged longitudinal sectional view of the front end portions of the upper rail, positioned at the front-end position, and the lower rail; the lock-release lever, the lock spring, the biasing spring and the rear end portion of the loop handle in a locked state.
Figure 16:
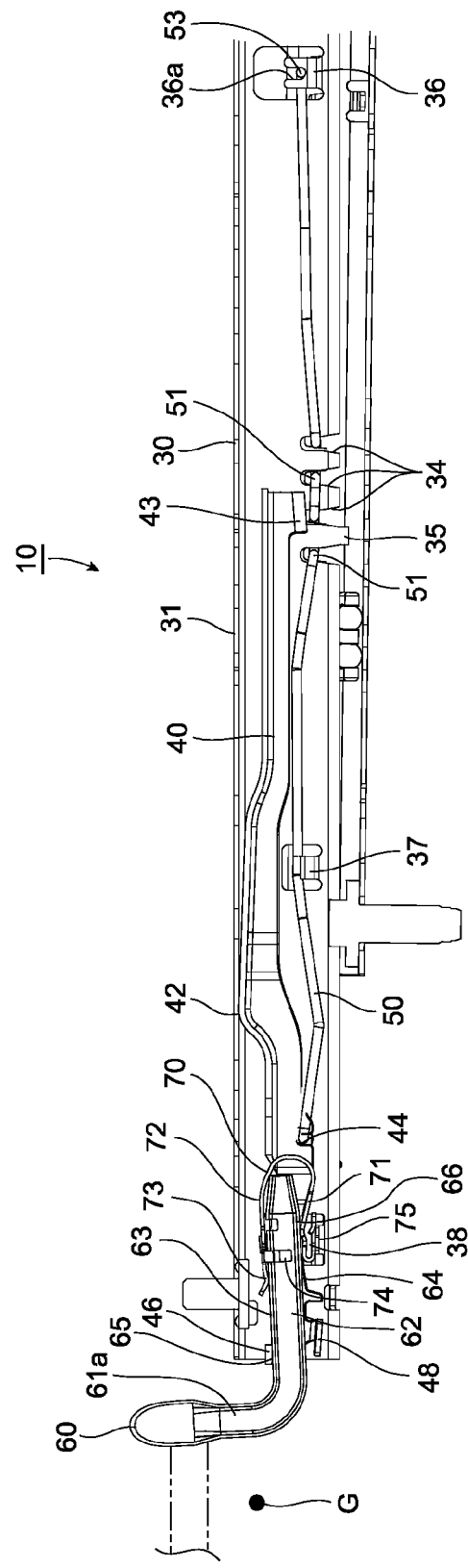
FIG. 16 is an enlarged longitudinal sectional side view similar to that of FIG. 15, in the case where the cushion airbag has instantly inflated by gas pressure.

The lock release lever 40 (and the biasing spring 70) is almost entirely accommodated in the associated upper rail 30 from the front end opening thereof (between the front end portion of the base 31 and the lower support portions 38) (as shown in FIGS. 15 and 16, only the front end portion of the upper supporting portion 46 projects forwardly from the upper rail 30), and the rotational contact protrusion 42 is in contact with a roof undersurface of the base 31 (see a contact portion "P" in FIGS. 10 and 11. Spaces are formed between the upper surface of the lock release lever 40, except the rotational contact protrusion 42, and a roof undersurface of the base 31). As shown in FIGS. 6 through 8, FIG. 10 and FIG. 11, in the lock spring 50, the rear-end lock-engaging portion 53 is lock-engaged with the spring lock-engaging grooves 36a of the left and right lock-engaging lugs 36 from above (see the triangular mark in FIG. 10), a portion positioned slightly forward from the locking portions 51 of the left and right sides are respectively lock-engaged with the left and right lock-engaging lugs 37 (see the triangular mark in FIG. 10), the locking portions 51 are engaged with the corresponding forward/rearward movement restriction grooves 34 from below, the left and right front-end locking lugs 52 are lock-engaged with the spring-hook grooves 44 from below, and the spring pressing-pieces 43 are positioned immediately above the upper surface of the portions, of the lock spring 50, positioned between the pair of locking portions 51 (the spring pressing-pieces 43 can contact the these portions of the lock spring 50 or can be positioned away from these portions of the lock spring 50). Hence, upon attaching the lock spring 50 to the upper rail 30 and the lock release lever 40, the lock spring is movable relative to the upper rail 30 in the forward/rearward direction within a very small range, such that the lock-engagement of the rear-end lock-engaging portion 53 of the lock spring 50 with the lock-engaging lug 36 is not released and the lock-engagement of the front-end locking lugs 52 is maintained with the spring-hook grooves 44. In addition, since the lock spring 50 produces an upward biasing force (elastic force) by being elastically deformed (see arrows ↑ shown in FIG. 10), this biasing force causes the rotational contact protrusion 42 of the lock release lever 40 to be pressed against the roof underside portion of the base 31, which enables the lock release lever 40 to rotate about the rotational contact protrusion 42 (about an imaginary rotation axis extending in the leftward/rightward direction) about the contact portion P between the roof underside portion and the rotational contact protrusion 42, and the lock release lever 40 is held in the locked position shown in FIGS. 10 and 15 when no upward external force is exerted on the front end portion of the lock release lever 40. On the other hand, exerting an upward external force on the front end portion of the lock release lever 40 against the biasing force of the lock spring 50 causes the lock lever 40 to rotate to the unlocked position shown in FIG. 11. Thereupon, as shown in FIG. 11, since the spring pressing-pieces 43 of the lock release lever 40 downwardly depress the portions positioned between the pair of locking portions 51, each locking portion 51 escapes downward from the associated lock groove 28 (see the locking portions 51 indicated with the imaginary lines shown in FIG. 9).

The biasing spring (biaser) 70 is a bilaterally-symmetrical member that is press-formed out of a metal plate. The biasing spring 70 is provided with a flat-plate base-surface supporting portion 71; an upper-surface pressing piece 72 which extends rearwardly from the rear end of the base-surface supporting portion 71, and thereafter extends forward; and a underside mounting piece 75 which extends downwardly from the front edge of the base-surface supporting portion 71, and thereafter extends rearwardly. An approximately V-shaped handle-pressing portion 73, as viewed in a side elevation, is formed on the front end of the upper-surface pressing piece 72. Furthermore, downward lock-engaging pieces 74 are provided on the left and right sides of the front portion of the upper-surface pressing piece 72.

The biasing spring 70 is inserted into an internal space (the space located directly below the roof hole 45) of the front-end portion of the lock release lever 40 from the front-end opening (between the upper supporting portion 46 and the underside supporting pieces 48) of the lock release lever 40. When the biasing spring 70 is inserted, since the rear-end portion of the upper-surface pressing piece 72 of the biasing spring 70 is inserted into the downward-facing U cross-sectional shaped portion of the lock release lever 40 (in a space located behind the space that is directly below the roof hole 45) (see FIGS. 15 through 17), and furthermore, since the underside mounting piece 75 engages, from the front, with the left and right lower support portions 38, and the downward lock-engaging pieces 74 engage with the left and right spring-hook recesses 47 of the lock release lever 40 from above, the biasing spring 70 becomes integral with the lock release lever 40 and the upper rail 30.

An assembly made by inserting an upper rail 30, a lock release lever 40, a lock spring 50 and a biasing spring 70, which are integrated in the above described manner, into a lower rail 21 from the front end opening or rear end opening of the lower rail 21 constitutes a rail unit 20. When a rail unit 20 is assembled, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56 which are rotatably supported by retainers 55 installed in the aforementioned spaces are in rotatable contact with both outer surfaces of the upright walls 32 and inner surfaces of the outer wall portions 23, which allow the upper rail 30 (and the lock release lever 40, the lock spring 50 and the biasing spring 70) to slide in the forward/rearward direction with respect to the lower rail 21. Furthermore, since a front-end stopper and a rear-end stopper, which are omitted from the drawings, are provided between the upper rail 30 and the lower rail 21, each upper rail 30 is slideable relative to the lower rail 21 between a front-end position (FIGS. 15 through 17) and a rear-end position (the position in FIGS. 1, 10 and 11).

Figure 8:
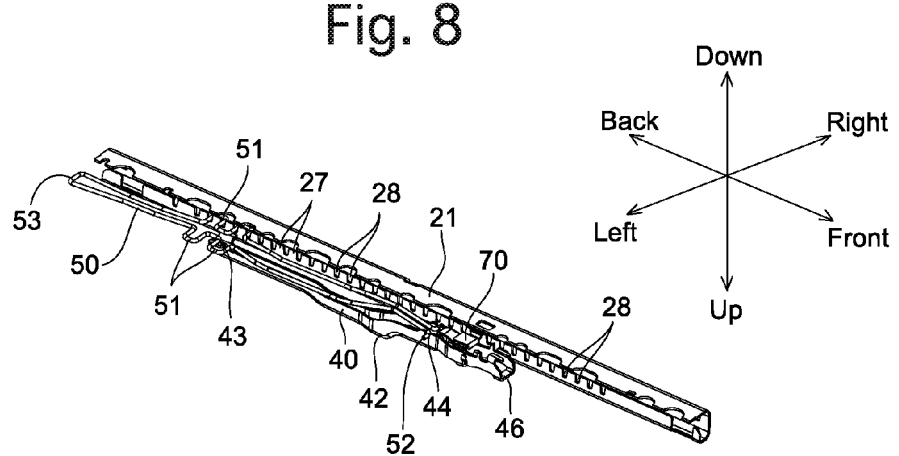
FIG. 8 is a front perspective view of the lower rail, shown as a longitudinal section view, the lock-release lever, and the lock spring, viewed obliquely from below.

In addition, when the lock release lever 40 is in the locked position, the upper rail 30 is prevented from sliding with respect to the lower rail 21 because the spring pressing-pieces 43 press, from above, the upper surfaces of the portions, of the lock spring 50, positioned between the pair of locking portions 51 (see FIG. 15), and because each locking portion 51 is engaged with the associated forward/rearward movement restriction groove 34 and lock groove 28 from below as shown in FIG. 8 and by solid lines in FIG. 9. On the other hand, rotating the lock release lever 40 down to the unlocked position causes each locking portion 51 which was engaged with some of the lock grooves 28 to be disengaged downward therefrom as shown by the phantom lines in FIG. 9, which allows the upper rail 30 to slide with respect to the lower rail 21.

The pair of left and right rail units 20 thus assembled are made to be parallel to each other and the positions thereof in the forward/rearward direction are made to coincide with each other (the sliding positions of the upper rails 30 with respect to the lower rails 21 are also made to coincide with each other); thereafter, a seat cushion SC of a seat (not shown) is mounted onto the upper surfaces of the upper rails 30.

After the left and right rail units 20 and the seat 11 are integrated in this manner, the loop handle (lock operational lever) 60 is connected to the left and right lock release levers 40 using the biasing springs 70.

Figure 17:
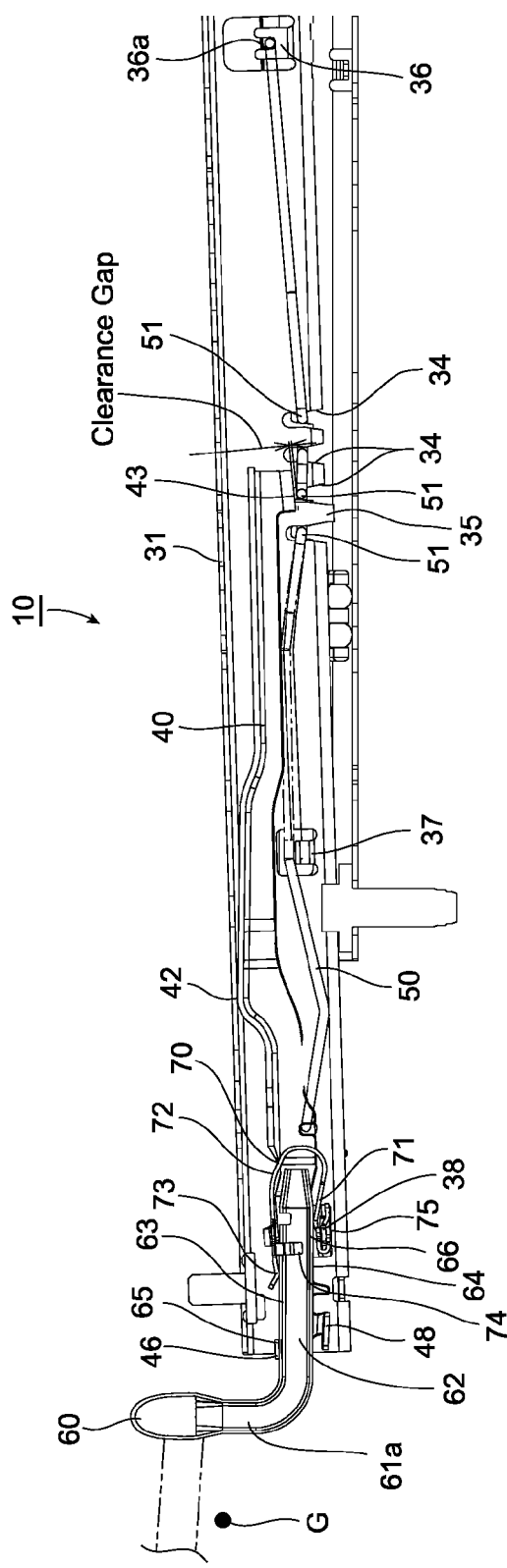
FIG. 17 is an enlarged longitudinal sectional side view similar to that of FIG. 15, in the case where the lock-release lever has further rotated from the state shown in FIG. 16 by the gas pressure in the cushion airbag.

The metal loop handle 60 is provided with an operation portion 61 which extends in the leftward/rightward direction, a pair of oblique portions extending obliquely outwardly from both left and right ends of the operation portion 61, downward-portions 61a which extend downwardly from both left and right ends of the oblique portions, and a pair of rear-end connecting portions 62 which respectively extend rearwardly from the left and right lower ends of the downward-portions 61a. An upper contacting surface 63 and the lower contacting surface 64 of each rear-end connecting portion 62 are mutually parallel (horizontal) flat surfaces. The front portion of each upper contacting surface 63 constitutes a press portion 65, and the rear portion of each lower contacting surface 64 constitutes a lower supported portion 66. Furthermore, a lock-engaging groove 67 which extends in the leftward/rightward direction is formed in the vicinity of the rear end of each upper contacting surface 63. As shown in FIGS. 15 through 17, the center of gravity G of the loop handle 60 is at a position further forward than the downward-portions 61a and the press portion 65, and at a position rearward from the operation portion 61.

The loop handle 60 is connected to the lock release levers 40 by inserting the left and right rear-end connecting portions 62 into the internal spaces of the front ends of the lock release levers 40, respectively. Upon inserting the rear-end connecting portions 62, each rear-end connecting portion 62 enters into a space between the base-surface supporting portion 71 and the upper-surface pressing piece 72 (handle-pressing portion 73), the front portion of the base-surface supporting portion 71 contacts the lower supported portion 66, the underside supporting pieces 48 contact the front portion of the lower contacting surface 64, the lock-engaging groove 67 engages with the left and right downward lock-engaging pieces 74 from below, and the handle pressing portion 73 comes in contact with the vicinity of the rear end of the upper contacting surfaces 63 (the portion immediately in front of the lock-engaging groove 67). Since upward/downward space between the base-surface supporting portion 71 and the handle pressing portion 73 is narrower than the upward/downward dimensions of the rear-end connecting portions 62 before the rear-end connecting portions 62 are inserted into each internal space of the front end portion of each lock release lever 40, when the rear-end connecting portion 62 is inserted in the space between the base-surface supporting portion 71 and the upper-surface pressing piece 72 (handle pressing portion 73), the upper-surface pressing piece 72 elastically deforms upwards, and the pressing force from the base-surface supporting portion 71 and the handle pressing portion 73 respectively applies against the lower contacting surface 64 and the upper contacting surfaces 63. Furthermore, the vicinity of the front end of the base-surface pressing piece 76, which has elastically deformed downwardly, comes in contact with the front portion of the lower contacting surface 64. Subsequently, the left and right rear-end connecting portions 62 and the front ends of the lock release levers 40 become integral with each other via the biasing springs 70, respectively, and each rear-end connecting portion 62 is, in effect, restricted from moving in the forward/rearward direction relative to the lock release lever 40.

Upon assembling the slide rail device 10 by integrating the loop handle 60 with the left and right rail units 20, as described above, since the rear-end connecting portions 62 are constantly supported by the front portions of the base-surface supporting portions 71 from below and the rear-end connecting portions 62 constantly receive a downward biasing force from the upper-surface pressing pieces 72 (handle pressing portions 73), the loop handle 60 (rear-end connecting portions 62) is relatively rotatable, with respect to the biasing springs 70, about the contact portions thereof with the front portions of the base-surface supporting portion 71 and the contact portions thereof with the handle pressing portions 73. Specifically, when an external force (other than that of each biasing spring 70) is not exerted on the loop handle 60, the loop handle 60 is positioned at the lock-allowing position (FIGS. 10 and 15) by the biasing force of the biasing springs 70, and when the entire loop handle 60 is rotated upward (the operation portion 61 is moved upward with respect to the center of gravity G), the loop handle 60 rotates to the lock-release position (the position in FIG. 11). When the loop handle 60 is at the lock-allowing position, each upper supporting portion 46 moves upward away from the corresponding press portion 65 (as shown in FIG. 15, a clearance gap exists between the upper supporting portions 46 and the press portions 65, respectively, at this time).

A cushion airbag 80 and an inflater which is connected to the cushion airbag 80 are built into the inside of the seat cushion SC (see FIG. 15). An automobile, in which the slide rail device 10 is installed, is provided with an ECU (Electronic Control Unit) which is connected to the inflater. If the automobile collides with another obstacle (e.g., another vehicle, etc.) that is positioned in front of the automobile, a signal is sent from the ECU to the inflater, so that the inflater injects gas. Accordingly, the cushion airbag 80 that is usually in a shrunken state (see designator 80A) instantly expands by the gas pressure (see designator 80B).

An assembled slide rail device 10 is attached to the vehicle interior floor by mounting the left and right lower rails 21 onto the vehicle interior floor.

Next the operation of the slide rail device 10 will be described hereinbelow.

Upon the occupant grasping the operation portion 61 by hand and rotating the entire loop handle 60 upwards (upon moving the operation portion 61 upwards with respect to the center of gravity G) when the lock release levers 40 are positioned at the locked position and the loop handle 60 is positioned at the lock-allowing position, the loop handle 60 rotates to the lock-release position. Accordingly, since the front portions of the rear-end connecting portions 62 move upward with respect to the rear portions of the rear-end connecting portions 62 and the press portions 65 contact the upper supporting portions 46, respectively, from below, this rotational force is transmitted from the rear-end connecting portions 62 to the front end portions of the lock release levers 40, and the lock release levers 40 rotate upward together with the rear-end connecting portions 62. Subsequently, since each lock release lever 40, which was positioned at the locked position, rotates to the unlocked position (see FIG. 11), the upper rails 30, which were restricted from sliding relative to the lower rail 21, can slide relative to the lower rails 21.

On the other hand, upon the occupant grasping the operation portion 61 by hand and rotating the entire loop handle 60 downwards (upon moving the operation portion 61 downwards with respect to the center of gravity G) when the lock release levers 40 are positioned at the locked position and the loop handle 60 is positioned at the lock-allowing position, the front portions of the rear-end connecting portions 62 of the loop handle 60 move downward with respect to the rear portions thereof. Subsequently, although the rear-end portions of the rear-end connecting portions 62 move the handle-pressing portions 73 upward while elastically deforming the upper-surface pressing pieces 72, respectively, since the upward moving force of the rear-end portions of the rear-end connecting portions 62 is absorbed by the upper-surface pressing pieces 72 (biasing springs 70), the lock release levers 40 do not rotate. Hence, in the case where the entire loop handle 60 is rotated downward in this manner, the rail units 20 are maintained in the locked state.

Next the operations that are carried out in the case where the automobile collides with another obstacle (a vehicle, etc.) that is positioned in front of the automobile, when the upper rails 30 are positioned at the frontmost end position, will be discussed hereinbelow.

In such a case, when the ECU detects a collision with another obstacle (vehicle, etc.) that is positioned in front of the automobile, the ECU sends a signal to the inflater. Subsequently, since the inflater injects gas, the cushion airbag 80 that was in a shrunken state (80A) is instantly expanded (80B) by the gas pressure. Since the seat cushion SC expands due to this inflating operation of the cushion airbag 80, forward movement of a passenger sitting on the seat cushion SC is restricted.

Furthermore, when the seat cushion SC expands, since the front portions of the upper rails 30 momentarily elastically deform downwards (not shown) (sometimes part of the front portions also plastically deform) by the pressure from the seat cushion SC exerting onto the upper rails 30, the front portions of the lock release levers 40, which are firmly held at the locked position by the biasing force of the lock springs 50, momentarily move downward together with the front portions of the upper rails 30, and since the rear portions of the lock release levers 40 move upward relative to the lower rails 21, the spring pressing-pieces 43 are moved away upward from the portions positioned between the respective pair of locking portions 51 (the locking portions 51 are restricted from moving upward with respect to the lower rails 21 by the lock grooves 28) (see FIG. 16).

On the other hand, since the weight of the loop handle 60 is greater than the lock release levers 40, the loop handle 60 remains at its original position (the position before the cushion airbag 80 is inflated) due to the influence of inertia. Accordingly, as shown in FIG. 16, the upper supporting portions 46 which are provided on the front portions of the lock release levers 40 (that have moved downward with respect to the rear portions thereof), respectively, abut against the press portions 65.

As shown in FIG. 17, when the lock release levers 40 move further downward together with the front portions of the upper rails 30 by the downward deforming force (the expanding force of the cushion airbag 80) of the front portions of the upper rails 30, since the loop handle 60 remains at the original position thereof, an upward reaction force from the loop handle (press portions 65) is exerted on the upper supporting portions 46 of the lock release levers 40, and this reaction force causes the front portions of the lock release levers 40 rotate upwardly relative to the upper rails 30. However, at this stage, since a clearance gap is secured between the spring pressing-pieces 43 of each lock release lever 40 and each lock spring 50 (this clearance gap occurs due to the clearance gap formed between the upper supporting portion 46 and the press portion 65 when the loop handle 60 is positioned at the lock-allowing position), the rotational force of each lock release lever 40 is not exerted from the spring pressing-pieces 43 onto the lock spring 50, and the locking portions 51 continue to remain inside the lock grooves 28.

By providing a clearance gap in such a manner between the press portions 65 of the loop handle 60, positioned at the initial position thereof, and the upper supporting portions 46 of the lock release levers 40, respectively, when the lock release levers 40 have moved downward (together with the front portions of the upper rails 30) caused by the inflating of the cushion airbag 80, since the lock release levers 40 (upper supporting portions 46) contact the loop handle 60 (press portions 65) after a predetermined amount of idle rotation of the lock release lever 40 (upper supporting portions 46), the locked state via the locking portions 51 and the lock grooves 28 is not unintentionally released even if the cushion airbag inflates. Therefore, according to the illustrated embodiment, even in a structure in which the lock release levers 40 are provided in the internal spaces of the upper rails 30, respectively (a structure in which the respective distance between the deforming portions of the upper rails 30 and the lock release lever 40 is close), the seat (seat cushion SC) and the upper rails 30 do not unintentionally forwardly slide relative to the lower rails 21.

The above-described present invention is not limited to the above-illustrated embodiment; various modifications are possible.

For example, when in a state shown in FIGS. 16 and 17, the spring pressing-pieces 43 of the lock release levers 40 can be made to contact the lock spring 50. However, also in such a case, a clearance gap is formed between the upper supporting portion 46 and the press portion 65 when each lock release lever 40 is positioned at the locked position and the loop handle 60 is positioned at the lock-allowing position, so that the locking portions 51 do not escape from the lock grooves 28 when in a state shown in FIGS. 16 and 17.

INDUSTRIAL APPLICABILITY

The vehicle slide rail device according to the present invention can reduce the possibility of the lock mechanism provided between the upper rail and the lower rail unintentionally lock-releasing when the cushion airbag is inflated.

REFERENCE SIGNS LIST

10 Slide rail device
20 Rail unit
21 Lower rail
22 Bottom wall
23 Outer wall portion
24 Roof underside portion
25 Inner wall portion
26 Base-end supporting portion
27 Lock teeth (lock mechanism)
28 Lock grooves (lock mechanism)
30 Upper rail
31 Base
32 Upright walls
33 Locking walls
34 Forward/rearward movement restriction grooves
35 Restriction portions
36 Lock-engaging lugs
36a Spring lock-engaging grooves
37 Lock-engaging lugs
38 Lower support portion
40 Lock release lever
41 Side walls
42 Rotational contact protrusion
43 Spring pressing-piece
44 Spring-hook groove
45 Roof hole
46 Upper supporting portion (lock-release contacting portion)
47 Spring-hook recess
48 Underside supporting pieces
50 Lock spring
51 Locking portions (lock mechanism)
52 Front-end locking lugs
53 Rear-end lock-engaging portion
55 Retainers
56 Bearing balls
60 Loop handle (lock operational lever)
61 Operation portion
61a Downward-portions
62 Rear-end connecting portion
63 Upper contacting surface
64 Lower contacting surface
65 Press portion
66 Lower supported portion
67 Lock-engaging groove
70 Biasing spring (biaser)
71 Base-surface supporting portion
72 Upper-surface pressing piece
73 Handle pressing portion
74 Downward lock-engaging pieces
75 Underside mounting piece
80 Cushion airbag
G Center of gravity of loop handle
P Contact portion
SC Seat cushion

The invention claimed is:

1. A slide rail device of a vehicle, comprising:
a lower rail which extends in a forward/rearward direction and is immovable relative to a floor of the vehicle;
an upper rail which supports a seat and is supported by said lower rail to be slideable in said forward/rearward direction;
a lock mechanism which restricts or releases restriction of a sliding movement of said upper rail;
a lock release lever which is interconnected with said lock mechanism, and which is upwardly and downwardly rotatable relative to said upper rail between a locked position, at which the restriction of sliding via said lock mechanism is allowed, and an unlocked position, at which said restriction of sliding is released;
a lock operational lever, a rear portion of which is upwardly/downwardly rotatably connected to a front portion of said lock release lever, said lock operational lever being rotatable between a lock-allowing position, in which said lock release lever is positioned at said locked position, and a lock-release position, in which said lock release lever is moved to said unlocked position;

a biaser, provided between said lock release lever and said lock operational lever, said biaser rotatably biasing said lock operational lever toward said lock-allowing position with respect to said lock release lever; and a cushion airbag, attached to said seat, said cushion airbag inflating when a front portion of said vehicle collides with another object, other than said vehicle, wherein said lock operational lever rotates to said lock-release position by a front portion of said lock operational lever moving upward, relative to said rear portion thereof, when positioned at said lock-allowing position, wherein said lock-release lever is provided with a lock-release contacting portion, which is positioned away from a press portion of said lock operational lever when said lock operational lever is positioned at said lock-allowing position and which receives a force from said press portion for rotating said lock release lever toward said unlocking position of said lock release lever when said lock operational lever rotates from said lock-allowing position toward said lock-release position, and wherein, when said upper rail is deformed downwardly due to pressure by the inflating of said cushion airbag, said lock release lever moves downwardly together with a downwardly deforming portion of said upper rail and said lock-release contacting portion moves in a direction to closely approach said press portion of said lock operational lever.

2. The slide rail device of a vehicle according to claim 1, wherein said upper rail is formed in a channel shape, and wherein said lock mechanism and said lock release lever are provided in an internal space within said upper rail.

\* \* \* \* \*